United States Patent
Ballard et al.

(10) Patent No.: US 12,233,910 B2
(45) Date of Patent: Feb. 25, 2025

(54) INDOOR LOCALIZATION OF AUTONOMOUS VEHICLES

(71) Applicant: Argo AI, LLC, Pittsburgh, PA (US)

(72) Inventors: Benjamin David Ballard, Sewickley, PA (US); Matthew Puchalski, Pittsburgh, PA (US); Dale Humbert Lord, Gibsonia, PA (US); Jason Paul Ziglar, Pittsburgh, PA (US); John Martin Seminatore, Pittsburgh, PA (US); Adela Hsien-Neng Wee, Glenshaw, PA (US); Kevin Scott Swanson, Detroit, MI (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 336 days.

(21) Appl. No.: 17/181,455

(22) Filed: Feb. 22, 2021

(65) Prior Publication Data

US 2022/0266867 A1    Aug. 25, 2022

(51) Int. Cl.
 *B60W 60/00* (2020.01)
 *G01C 21/20* (2006.01)
 *H04W 4/029* (2018.01)

(52) U.S. Cl.
 CPC ....... *B60W 60/0025* (2020.02); *G01C 21/206* (2013.01); *H04W 4/029* (2018.02); *B60W 2420/403* (2013.01); *B60W 2420/408* (2024.01)

(58) Field of Classification Search
 None
 See application file for complete search history.

(56) References Cited

U.S. PATENT DOCUMENTS

| 10,471,992 B2 | 11/2019 | Brennan et al. |
| 2016/0033963 A1 | 2/2016 | Noh |

(Continued)

FOREIGN PATENT DOCUMENTS

| KR | 10-2016-0015987 A | 2/2016 |
| WO | 2019055281 A2 | 3/2019 |
| WO | 2020177492 A1 | 9/2020 |

OTHER PUBLICATIONS

Huang et al. "Vision-based Semantic Mapping and Localization for Autonomous Indoor Parking", 2018 IEEE Intelligent Vehicles Symposium, Sep. 26, 2018, pp. 636-641, vol. 4, IEEE, New York, NY.

(Continued)

*Primary Examiner* — Tuan C To
*Assistant Examiner* — David Ruben Pedersen
(74) *Attorney, Agent, or Firm* — Sterne, Kessler, Goldstein & Fox P.L.L.C.

(57) ABSTRACT

Devices, systems, and methods are provided for indoor localization. A self-driving vehicle may detect a first fiducial marker located at a first location within a building, wherein the first fiducial marker comprises first fiducial marker information associated with the first location. The self-driving vehicle may retrieve the first fiducial marker information from the first fiducial marker. The self-driving vehicle may generate localization information of the self-driving vehicle based on the first fiducial marker information. The self-driving vehicle may utilize the localization information to transition to a second location within the building, wherein the second location comprises a second fiducial marker.

20 Claims, 7 Drawing Sheets

(56) References Cited

U.S. PATENT DOCUMENTS

| | | |
|---|---|---|
| 2016/0178382 A1 | 6/2016 | Kojo et al. |
| 2017/0061186 A1* | 3/2017 | Laurent .............. G06K 7/1421 |
| 2017/0297625 A1 | 10/2017 | Yion et al. |
| 2017/0313307 A1 | 11/2017 | Nordbruch |
| 2017/0323129 A1* | 11/2017 | Davidson ............... G01C 21/28 |
| 2018/0004219 A1 | 1/2018 | Aldred et al. |
| 2018/0111274 A1 | 4/2018 | Seok et al. |
| 2018/0301031 A1 | 10/2018 | Naamani et al. |
| 2018/0306587 A1 | 10/2018 | Holz |
| 2018/0330172 A1* | 11/2018 | Lee ..................... G05D 1/0246 |
| 2019/0016384 A1 | 1/2019 | Carlson et al. |
| 2019/0056483 A1 | 2/2019 | Bradley et al. |
| 2019/0080612 A1 | 3/2019 | Weissman et al. |
| 2019/0265722 A1 | 8/2019 | Haeusler et al. |
| 2019/0332096 A1* | 10/2019 | Porter ................. G06Q 10/087 |
| 2020/0050894 A1 | 2/2020 | Park |
| 2020/0089237 A1* | 3/2020 | Whitaker ............. G01C 21/206 |
| 2020/0164510 A1 | 5/2020 | Gong et al. |
| 2020/0301445 A1* | 9/2020 | Jourdan ................ B64U 30/20 |

OTHER PUBLICATIONS

Fang et al. "Marker-Based Mapping and Localization for Autonomous Valet Parking", 2020 IEEE/RSJ International Conference on Intelligent Robots and Systems (IROS), 2020, pp. 1-6, IEEE, New York, NY.

Choi et al. "In-Lane Localization and Ego-Lane Identification Method Based on Highway Lane Endpoints", Hindawi Journal of Advanced Transportation, Feb. 1, 2020, pp. 1-16, vol. 2020, Cairo, Egypt.

International Search Report and Written Opinion of the International Searching Authority directed to related International Patent Application No. PCT/US2022/016666, mailed May 31, 2022; 10 pages.

* cited by examiner

INDOOR LOCALIZATION OF AUTONOMOUS VEHICLES

TECHNICAL FIELD

This disclosure generally relates to systems and methods for indoor localization of autonomous vehicles.

BACKGROUND

Localization is an important aspect of running autonomous vehicles in autonomous mode. Autonomous vehicles are equipped with a sensor system to help perform localization of these vehicles and to collect data relating to the current and developing state of the vehicle's surroundings. The proper performance of a vehicle depends on the accuracy data collected by the sensors in the sensor system. The sensor system may comprise visual spectrum cameras, laser-ranging devices (LIDARs), thermal sensors, or other types of sensors. The sensor system enables a vehicle to detect objects and obstacles in the vicinity of the vehicle and tracks the velocity and direction of pedestrians, other vehicles, traffic lights, or similar objects in the environment around the vehicle. In addition to sensing the vehicle's surroundings, a vehicle relies on a global positioning system (GPS) to determine its location while traveling on a road. However, GPS signals may become unreliable because these signals may be attenuated and scattered by roofs, walls, and other objects. Additionally, Wi-Fi signals are prone to interference in an indoor environment. Therefore, there is a need to enhance the localization of autonomous vehicles where GPS signals may become attenuated such as within indoor spaces.

Figure 1:
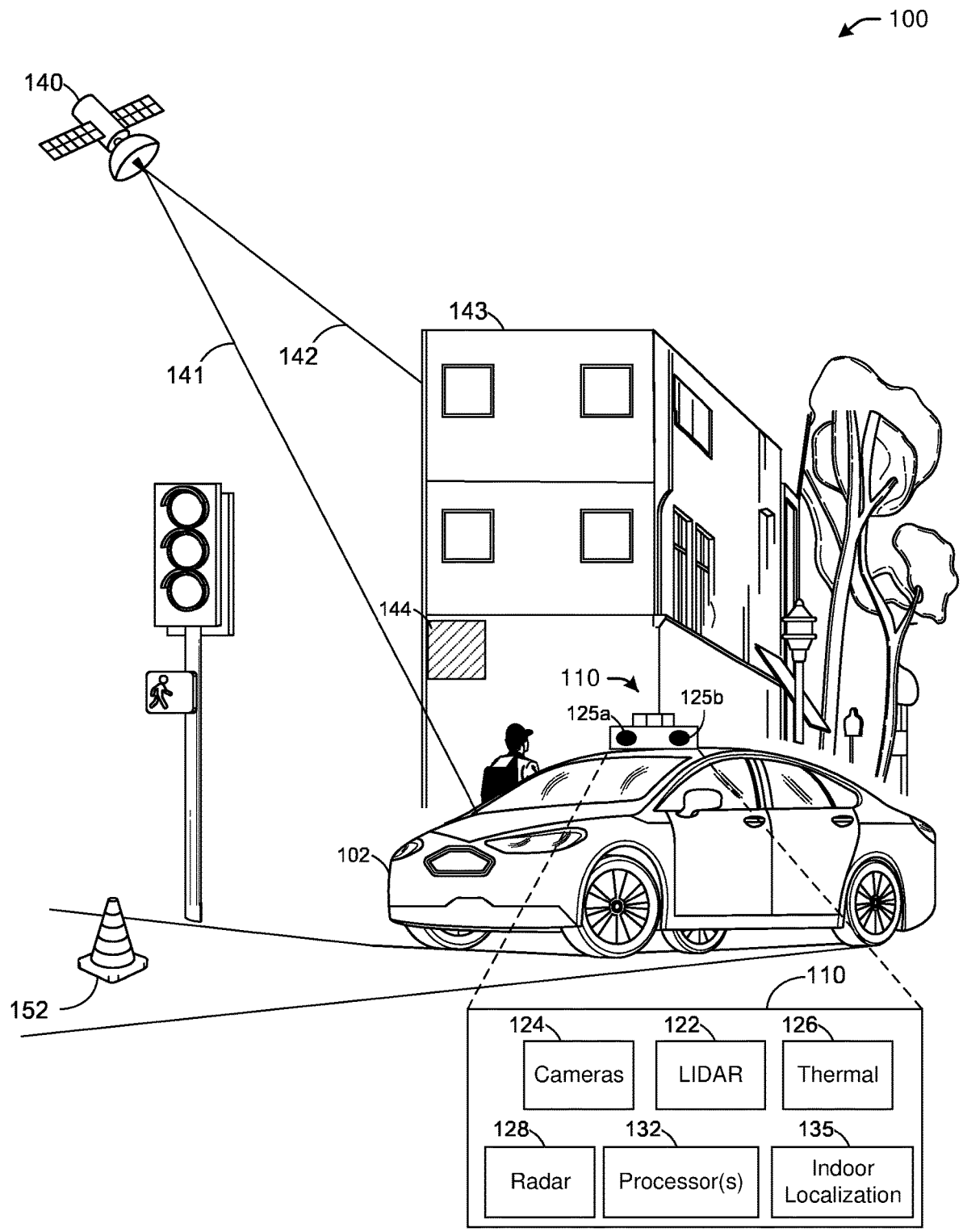
FIG. 1 illustrates an example environment of a vehicle, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Sensors may be located at various positions on an autonomous vehicle. These sensors may include LIDAR sensors, stereo cameras, radar sensors, thermal sensors, or other sensors attached to an autonomous vehicle. These sensors may be originally used in a lab environment in order to perform high precision analyses of their performance under certain conditions. Autonomous vehicles may be driven in the real-world and rely on the attached sensors to perform to a certain performance level under environmental factors. As the autonomous vehicles are driven in the real world, objects may be detected and analyzed to permit the vehicle to navigate in that environment using vehicle maps for the environment the vehicle is operating in. Understanding the movements of a vehicle using the collected data before placing the vehicle in the real-world environment is an important step in testing.

Localization is required in order to run autonomous vehicles in autonomous mode. However, the process of becoming localized (known as "bootstrapping") does not currently work in an indoor space as it requires a GPS signal lock, which does not provide good location estimates indoors. Indoor localization will aid future development as well as enable new spaces for autonomous vehicles to operate.

In order to make sense of the 3D space, the vehicle may need to first collect data associated with 3D space using, for example, LIDARs, radars, cameras, and/or other sensors. The vehicle may use that data to determine its pose within that 3D space. One technique that may be employed by the vehicle is the use of transformation information that utilizes transformation matrices to represent movements in the 3D space. These transformation matrices describe the rotation and translation of the vehicle with respect to another object. In other words, the transformation matrices help the vehicle determine how it is transformed with respect to another object. In order to describe the vehicle in 3D space, its rotation and translation around its own coordinate system may need to be determined with respect to a reference coordinate system. Having a coordinate system associated with the vehicle gives a defined description when rotating and translating the vehicle.

Example embodiments described herein provide certain systems, methods, and devices for indoor localization.

Self-driving vehicles typically operate in a mapped area that has been previously plotted and not in a completely new area. A challenge may be for a vehicle to determine where it is on a mapped area. That is one reason why it is important to perform a process of localizing the vehicle in order to determine where it is in space. The information that results from localization not only include the location but also the orientation of the vehicle. This information is crucial for the vehicle to properly navigate its surrounding.

One of the challenges associated with localization is being able to determine the pose (location and orientation) of the vehicle even in an indistinguishable area. For example, different floors of a parking garage, which typically are indistinguishable from each other. GPS information can be reliable on the outside of a building. However, in an indoor environment, such as a parking garage or the like, GPS signals become weak and unreliable due to interference from the building structure. Even if GPS information is good, the issue arises from elevation determination (e.g., being on the first floor or the second floor of a building). An indoor localization system may also allow for autonomous movement of the autonomous vehicle in and out of multi-level garages/depots.

In one or more embodiments, an indoor localization system may facilitate the use of one or more fiducial markers at various locations of an indoor space. Continuing with the example of a parking garage, a fiducial marker may be programmed with various information that assists in localizing a self-driving vehicle in order to allow it to operate within the parking garage. For example, a fiducial marker may comprise, at least in part, GPS coordinate associated with the building, orientation, and hyperlocal information such as parking spaces, floor, or any other indicators. In addition to the information captured in the fiducial marker, an indoor localization system may determine a distance between the vehicle and the fiducial marker using stereo cameras in the vehicle. Other means of determining the distance between the vehicle and the fiducial marker may be used, such as IR, radar, LIDAR, or any other sensors capable of determining such distance. When the vehicle detects and decodes a fiducial marker, the vehicle may use the information comprised in the fiducial marker and the distance to the fiducial marker to estimate the pose of the vehicle to allow it to move about the space in that area. A map associated with the vehicle may help the vehicle determine a path using the information captured from the fiducial marker. The fiducial marker may be associated with a position that is located on the map itself. The vehicle accesses the map in order to determine information associated with the building and also outside the building in the surrounding area (where GPS information is available).

As an autonomous vehicle enters a building, localization of this vehicle may be lost due to GPS information loss. A fiducial marker at the entrance of the building and also at various locations within the building may assist the vehicle in navigating within the building (e.g., parking, etc.).

In one or more embodiments, an indoor localization system may utilize various approaches to determine specific features of an indoor space (e.g., a parking spot within a parking garage at a specific floor). Some of these approaches may include using Near Field detection models for detecting lines on the ground. Another approach may be using a secondary fiducial marker in front of parking spaces that comprise information that may assist the vehicle, in conjunction with the vehicle map, to navigate that space. It should be understood that other devices on the vehicle may also be used to detect and decode the information comprised in the fiducial markers. A combination of sensors may be used to help navigate the area. For example, a camera may capture an image of the fiducial marker in order to decode information from the fiducial marker and determine the distance from the vehicle to the fiducial marker. In addition, a radar and/or a LIDAR may be used in order to detect objects within the vicinity of the vehicle in order to assist the vehicle in navigating that space.

In one or more embodiments, the fiducial marker may be encoded with a code that may be used by the vehicle to understand its surroundings. For example, the vehicle may detect and capture that code using a camera mounted on the vehicle. The vehicle may decode that code to derive information in the code that is useful for the vehicle to navigate in the indoor space.

In one or more embodiments, the code may be associated with a lookup table stored in the vehicle's computer system or a remote server accessible by the vehicle. The table may contain a plurality of entries associated with various codes in various fiducial markers. The vehicle may determine a specific entry within the table that is associated with the captured code. The entry may contain relevant information that may assist the vehicle in navigating the indoor space. It should be understood that other means may be used to retrieve information associated with a vehicle map using the code encoded in the fiducial markers. Other methods may include infrared spectrum as opposed to the visible spectrum to understand the surroundings of the vehicle. Another method may include using LIDAR to detect the reflectivity of a given surface to determine where the vehicle is located on the vehicle map and to assist the vehicle in navigating the indoor space.

In one or more embodiments, an indoor localization system may maintain localization of an autonomous vehicle when the vehicle enters indoor spaces, navigate these spaces, or leave these spaces, where GPS signals are not reliable.

In one or more embodiments, an autonomous vehicle may detect a fiducial marker that may be located in a line of sight of a camera mounted on the vehicle. For example, a fiducial marker may be placed at the entrance of an indoor space (e.g., a parking garage, a warehouse, an enclosed structure, or any other indoor space). Having a fiducial marker situated at the entrance of such a building may assist the vehicle in a smooth transition between the outdoor environment, where GPS signals are reliable, and the indoor environment, where GPS signals may become attenuated and unreliable.

In one or more embodiments, an indoor localization system may facilitate a testing setup that comprises one or more hardware and software components capable of detecting and decoding a fiducial marker associated with an indoor space that an autonomous vehicle may navigate in. The purpose of the testing setup is to develop and test the localization of a vehicle before being implemented in the vehicle. An example of a testing setup may comprise a camera device, a computer setup, one or more sensors (LIDAR, radar, IR, etc.), and a mobile cart capable of navigating the indoor space based on captured data associated with one or more fiducial markers.

In one or more embodiments, the fiducial marker may provide data that is not just location information but may be also encoded with known dimensions. The data may comprise transform information that can be captured and decoded by the vehicle in order to determine the pose of the vehicle with respect to known building coordinates in the map. It should be understood that the pose of a vehicle is a definition of the location and orientation of the vehicle in 3D space relative to a mapped area. A fiducial marker may assist the vehicle in knowing, for example, if the vehicle is facing forward or backward at the location it is at. Also, transform information comprises information associated with a 3D representation such as transition matrices that are associated with translation and rotation of an object.

In one or more embodiments, an indoor localization system may facilitate using a fiducial marker linked to information that assists an autonomous vehicle to navigate around its indoor surroundings. Some of the information may comprise general GPS location, floor, orientation, etc., and what floor the autonomous vehicle is located on. The fiducial marker may be captured by one of the cameras on the autonomous vehicle and would provide the necessary boost of information to perform indoor bootstrapping and therefore, localization. A fiducial marker or fiducial may be an object placed in the field of view of an imaging system that appears in the image produced for use as a point of reference and/or a measure. This fiducial may be either placed into or on the imaging subject, or a mark or set of marks in the reticle of an optical instrument.

In one or more embodiments, an indoor localization system may allow for the testing of a test bench setups that could benefit from running the entire stack (useful for full-system debugging) without all hardware of an autonomous vehicle. The test bench setup may comprise one or more sensors, a computer system, motors to move the test bench setup based on information received from the fiducial, and other components.

Some of the advantages of an indoor localization system may include adding new boot up locations when required such that they are not fixed on a map. For example, a new building may be used as an indoor space for autonomous vehicles by simply encoding one or more fiducial marks and placing them throughout this new building. The autonomous vehicle can detect and decode these fiducial marks in order to properly navigate this new building. Further, rearrangements of spaces within the new building may be feasible by updating the fiducial marks with any of these rearrangements. For example, parking lot rearrangement can occur such that the fiducial marks may be updated to account for the rearrangements.

The code could even provide additional metadata for ambiguous LIDAR matching scenarios. Ambiguous LIDAR matching scenarios may occur when spaces are the same but on different floors. For example, each floor of a covered parking building may look the same as another one in that building such that a LIDAR provides ambiguous data since it is not clear which floor the autonomous vehicle is on by simply recognizing objects on that floor. A fiducial mark may provide additional data such that the autonomous vehicle will be able to determine where the fiducial mark is physically located based on coordinate information that may be encoded in the fiducial mark. The camera on the autonomous vehicle may capture that information and know exactly where it is in the covered parking lot.

In one or more embodiments, a fiducial mark can provide not just data but if it has known dimensions then it can also send the transform information back to the camera of the autonomous vehicle. This could provide an exact pose with respect to some known building coordinates in the map. This would reduce the bootstrap time. As explained before, transforms or transformation information describes the rotation and translation of the vehicle with respect to another object. In other words, the transforms or transformation information helps the vehicle determine how it is transformed with respect to another object. In one or more embodiments, a fiducial mark may need to be placed in a location that may be visible by a vehicle. Further, the fiducial mark should be free from debris or other material that may hinder the camera from properly decoding the fiducial mark. The fiducial marks should be kept at the same location that corresponds to information that is encoded in the fiducial mark.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates example environment 100 of a vehicle 102, in accordance with one or more example embodiments of the present disclosure.

The modern automobile may have many electronic control units (ECUs) for various subsystems. Some of these subsystems may be used to provide proper operation of the vehicle. Some examples of these subsystems may include a braking subsystem, a cruise control subsystem, power windows, and doors subsystem, battery charging subsystem for hybrid and electric vehicles, or other vehicle subsystems. Communications between the various subsystems is an important feature of operating vehicles. A controller area network (CAN) bus may be used to allow the subsystems to communicate with each other. Such communications provide a wide range of safety, economic, and convenience features to be implemented using software. For example, sensor inputs from the various sensors around the vehicle may be communicated between the various ECUs of the vehicle via the CAN bus to perform actions that may the essential to the performance of the vehicle. An example may include auto lane assist and/or avoidance systems where such sensor inputs are used by the CAN bus to communicate these inputs to the driver-assist system such as lane departure warning, which in some situations may actuate breaking active avoidance systems.

Referring to FIG. 1, there is shown a vehicle 102 having a sensor system 110 for a plurality of cameras, emitters, and sensors. The sensor system 110 may be connected to the vehicle 102 (e.g., on top of the vehicle 102 as shown). In this environment 100, there is shown that sensor system 110 includes cameras such as stereo cameras 125a and 125b. The stereo cameras 125a and 125b may capture images of objects (e.g., object 152) in the vicinity and around the vehicle 102. Other emitters and sensors in the sensor system 110 may transmit and/or receive one or more signals in order to detect and/or capture information associated with objects in the vicinity and around the vehicle 102. For example, a LIDAR sensor may transmit a LIDAR signal (e.g., light or an electromagnetic wave), a radar uses radio waves in order to determine distances between the vehicle and objects in the vicinity of the vehicle, and a thermal sensor may capture temperature (e.g., based on an emitted and detected infrared signal or other laser signals).

In one or more embodiments, the sensor system 110 may include LIDAR 122. Some examples of a LIDAR such as Geiger mode LIDAR, ground-based LIDAR, large footprint LIDAR, small footprint LIDAR, or the like. The sensor system 110 may include cameras 124 such as stereo cameras that may capture images in the vicinity of the vehicle 102. The sensor system 110 may include a thermal sensor 126, such as thermistors, resistance temperature detectors, thermocouples, semiconductors, or the like. Further, the sensor system may include a radar 128, which may be any radar that uses radio waves to capture data from objects surrounding the vehicle 102. The sensor system 110 may also include one or more processors 132. The one or more processors 132 may control the transmission and reception of signals using the LIDAR 122, the cameras 124, the thermal sensor 126, the radar 128, and the indoor localization 135. The various sensors of the sensor system 110, when calibrated correctly, should indicate a proper distance and shape of object 152. In addition to detecting objects in the vicinity of the vehicle 102, the vehicle 102 relies on GPS signals coming from satellite 140 in order to determine localization information. The satellite 140 may transmit signals 141 and 142. Signal 141 may be received by the vehicle 102 while traveling on a road in open space. However, if the vehicle 102 would enter building 143, which may be, for example, a multi-level parking garage, the signal 142 may not fully penetrate the building 143 to reach the vehicle 102. This may result in an attenuated signal received by the vehicle 102 such that the attenuated signal may not provide a reliable GPS signal for the vehicle 102 to determine its location.

In one or more embodiments, one or more fiducial markers may be located at various locations of the building 143. For example, fiducial marker 144 may be located at the entrance of building 143 and may be programmed with various information that assists in localizing the vehicle 102 in order to allow it to operate within the parking garage. For example, the fiducial marker 144 and may comprise, at least in part, GPS coordinate associated with the building, orientation, and hyperlocal information such as parking spaces, floor, or any other indicators. When the vehicle 102 detects and decodes the fiducial marker 144, the vehicle may use the information comprised in the fiducial marker and the distance to the fiducial marker to estimate the pose of the vehicle to allow it to move within vehicle 143. A map associated with the vehicle may help the vehicle determine a path using the information captured from the fiducial marker 144. It is understood that the above descriptions are for purposes of illustration and are not meant to be limiting.

Figure 2:
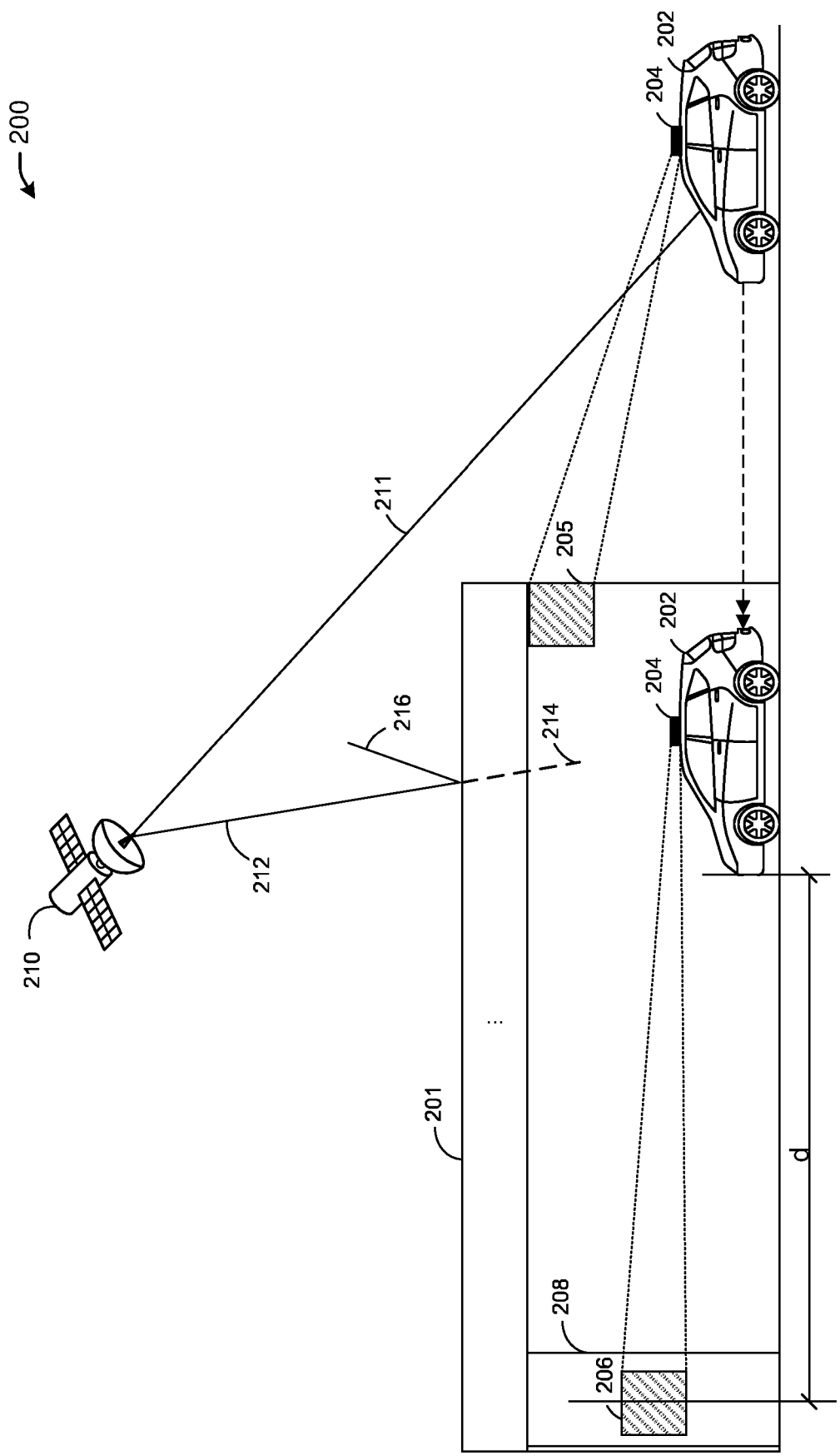
FIG. 2 depicts an illustrative schematic diagram for indoor localization, in accordance with one or more example embodiments of the present disclosure.

FIG. 2 depicts an illustrative schematic diagram 200 for indoor localization, in accordance with one or more example embodiments of the present disclosure.

Referring to FIG. 2, there is shown a vehicle 202 having a mechanism to detect objects, in this example this mechanism may be a camera 204. However, other mechanisms may be employed in order to detect objects around the vehicle 202. The vehicle 202 may be operating in an outdoor location where GPS signals from satellite 210 may be received by the vehicle 202. For example, signal 211 from satellite 210 may be received by vehicle 202 and may be used to determine a location on a map associated with the vehicle 202. The vehicle 202 may be traveling to enter an area that may have an attenuated GPS signal (e.g., moving to an indoor location, or traveling within a dense location). In order for the vehicle 202 to continue to properly operate as it travels, the vehicle 204 may detect a fiducial marker 205 placed at a transition point (e.g., entering the building 201). This fiducial marker 205 may comprise information that may assist the vehicle 202 to determine that it needs to transition from utilizing GPS signals to utilizing fiducial markers placed within the building 201 while navigating in the building 201.

The vehicle 202 may transition to the indoor space of building 201, where building 201 may be comprised of one or more floors. In an outdoor environment, the vehicle 202 may utilize GPS signals received from satellite 210 (e.g., signal 211). The vehicle 202 may utilize those GPS signals to determine information associated with its location. However, when the vehicle 202 enters the building 201, the GPS signals (e.g., signal 212) may become attenuated due to concrete that encloses the building 201. In this example, a portion (signal 216) of signal 212 may be deflected by the roof of the building 201 and only an attenuated signal 214 of the signal 212 may enter the building 201. Although the attenuated signal 214 may be received by the vehicle 202, this attenuated signal 214 may not be reliable enough for the vehicle 202 to perform localization.

In one or more embodiments, within the building 201, there may be a plurality of fiducial markers (e.g., fiducial marker 206) that may be placed strategically within the environment that the vehicle 202 may be operating in. The fiducial marker 206 may be placed for example on a structure 208. The structure 208 may be a column, a wall, a floor, an object, another vehicle, or any other surface that the fiducial marker 206 may be placed on. The fiducial maker 206 may also be displayed on a display device, such as a monitor or the like. The fiducial marker 206 may become in the line of sight of the camera 204 as the vehicle 202 enters building 201. It should be understood that there may be a plurality of fiducial markers placed within the indoor space of the building 201 such that each fiducial marker provides specific information associated with the location that the fiducial marker is placed at. The camera 204 may detect and capture images associated with the fiducial marker 206. The vehicle 202 may receive data associated with the images captured of the fiducial marker 206 from the camera 204. The vehicle 202 may process this data in order to extract the type of information that may be programmed within the fiducial marker 206. Further, the vehicle 202 may determine its distance (e.g., distance d) and orientation to the fiducial marker 206. It is understood that the above descriptions are for purposes of illustration and are not meant to be limiting.

Figure 3:
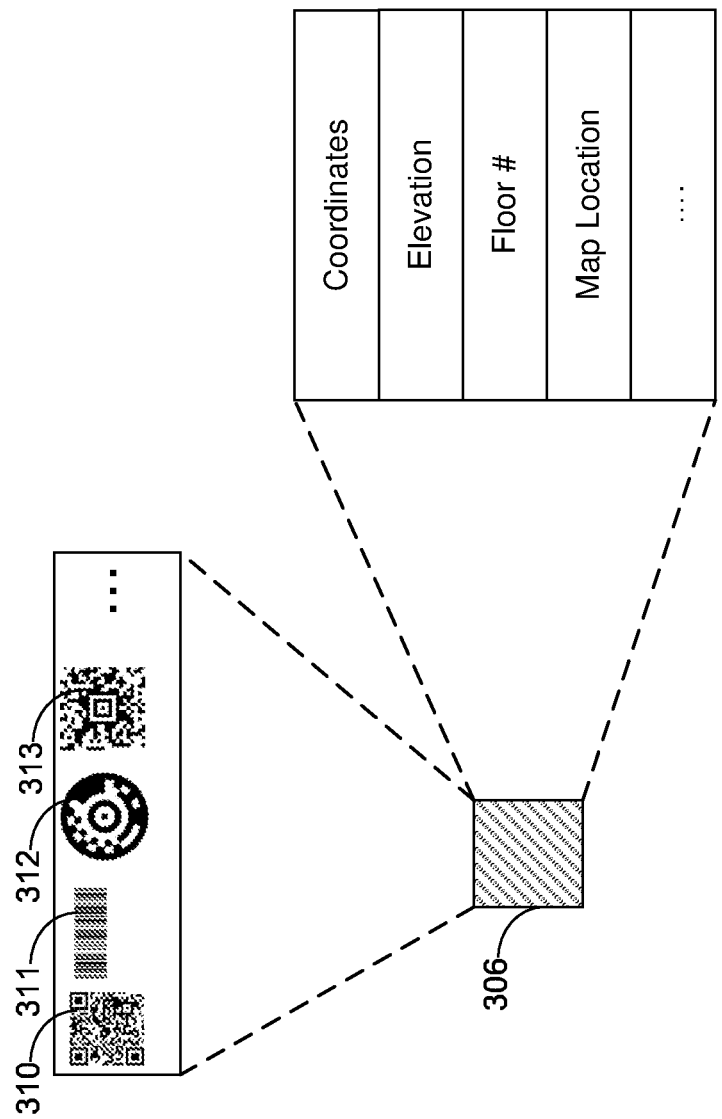
FIG. 3 depicts an illustrative schematic diagram for indoor localization, in accordance with one or more example embodiments of the present disclosure.

FIG. 3 depicts an illustrative schematic diagram 300 for indoor localization, in accordance with one or more example embodiments of the present disclosure.

Referring to FIG. 3, there is shown a fiducial mark 306 that may be placed in one or more locations corresponding to information encoded inside the fiducial mark.

In one or more embodiments, the fiducial mark 306 may be an object placed in the field of view of an imaging system that appears in the image produced, for use as a point of reference. This fiducial may be either placed on an object, in the reticle of an optical instrument or may be displayed on a monitor.

In the example of FIG. 3, various types of fiducial marks are shown. However, it should be understood that other fiducial marks may be used. Fiducial marks may comprise QR code 310, bar code 311, shotcode 312, Aztec code 313, or any other code that may be encoded with information. Further, the fiducial code may be placed either on a column, a wall, a floor, an object, another vehicle, or any other surface that the fiducial marker may be placed on. The fiducial maker may also be displayed on a display device, such as a monitor or the like.

In one or more embodiments, some of the information that may be encoded inside the fiducial mark 306 may include, but not limited to, coordinate information, elevation, floor number, map location, etc. It should be understood that the information encoded in the fiducial marker is not limited to the above example fiducial markers and that this may depend on the implementation and the type of fiducial mark used.

It is understood that the above descriptions are for purposes of illustration and are not meant to be limiting.

Figure 4:
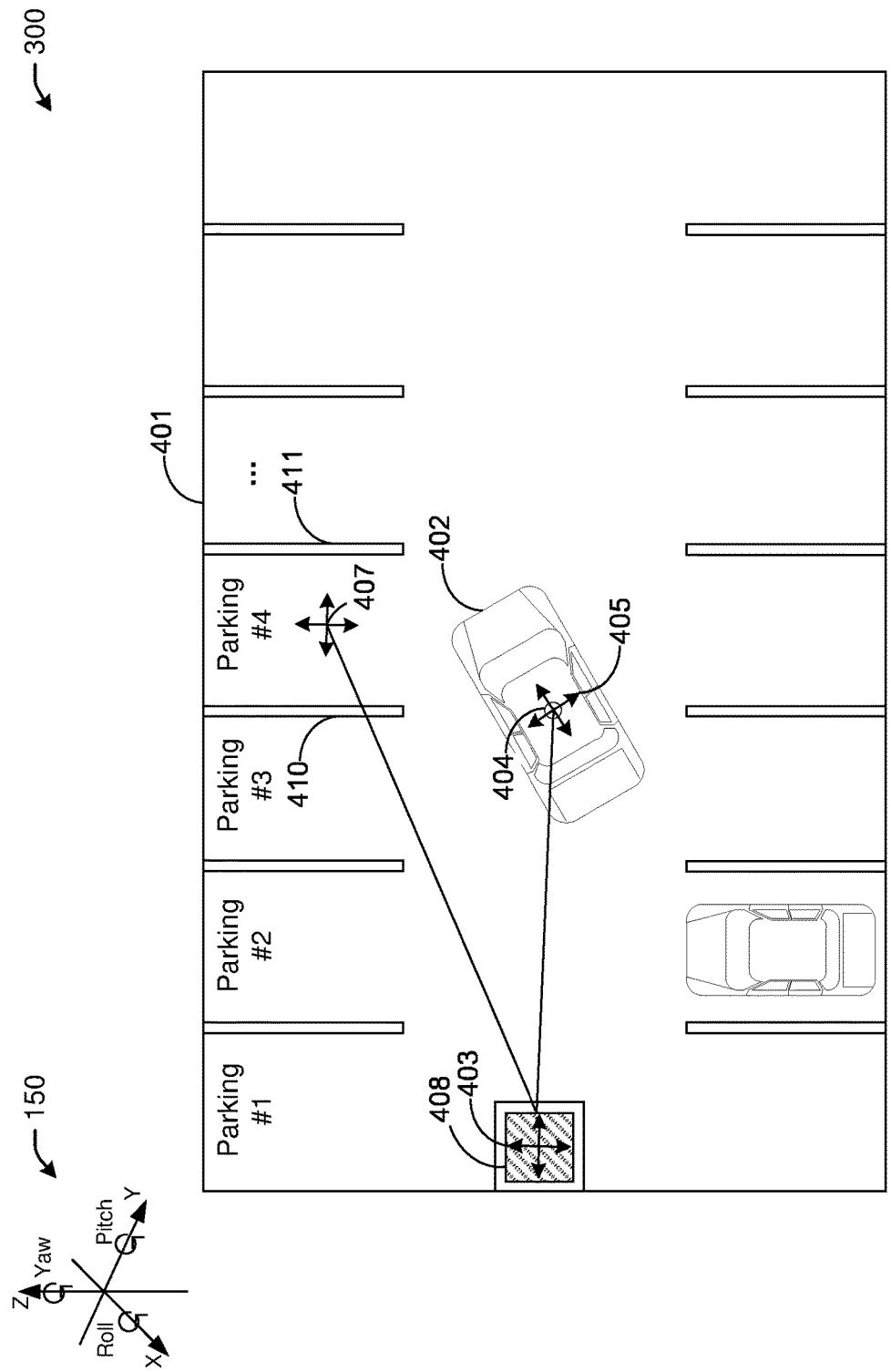
FIG. 4 depicts an illustrative schematic diagram for indoor localization, in accordance with one or more example embodiments of the present disclosure.

FIG. 4 depicts an illustrative schematic diagram 400 for indoor localization, in accordance with one or more example embodiments of the present disclosure.

Referring to FIG. 4, there is shown a floor 401 of a parking garage is shown as an example to illustrate the mechanism for using a fiducial marker 408 that is placed on a column of the floor 401. Vehicle 402 may comprise a sensor system 404 that is mounted on the vehicle 402. Although the sensor system 404 is shown to be mounted on top of the vehicle 402, it should be understood that comprises any sensor that may be mounted anywhere on the vehicle 402 (e.g., LIDAR, radar, cameras, IR, etc.) In addition, a coordinate system 150 is shown for rotation and translation around the three axes X, Y, and Z. The coordinate system 150 may provide the pitch, roll, and yaw in order to determine the translation and orientation of an object. Other coordinate systems that are consistent with the coordinate system 150 may be associated with various objects within floor 401. For example, the fiducial marker, the vehicle, and a specific location on the floor 401 may have their own coordinate system.

As explained above, the information that may be encoded in the fiducial mark 408 may include, but not limited to, coordinate information, elevation, floor number, map location, etc. It should be understood that the information encoded in the fiducial marker is not limited to the above example fiducial markers and that this may depend on the implementation and the type of fiducial mark used. Further, the fiducial marker 408 may provide data that is not just location information but may be also encoded with known dimensions. The data may comprise transform information that can be captured and decoded by the vehicle 402 in order to provide the pose of the vehicle 402 with respect to known building coordinates in the map. The fiducial marker 408 may assist the vehicle 402 in knowing for example if the vehicle 402 is facing forward or backward at the location it is at. Also, transform information comprises information associated with a 3D representation such as transition matrices that are associated with translation and rotation of an object. For example, it is shown in FIG. 4 that the fiducial marker 408 may be associated with a coordinate system 403 that indicates the orientation and translation (e.g., pose) of the fiducial marker 408 relative to a map. Similarly, the vehicle 402 may also be associated with a coordinate system 405 that indicates the pose of the vehicle 402 as the vehicle 402 moves around its surroundings on the floor 401. Also, in FIG. 4, there is shown a plurality of parking spots that vehicle 402 may want to park in. For example, a parking #4 is shown to be associated with a specific coordinate system 407. The fiducial marker 408 may comprise information that could assist the vehicle 402 in parking in one of these parking spots. For example, the fiducial marker 408 may comprise the specific coordinates and the transform information of the parking #4 with respect to other parking spots and with respect to the floor 401. Knowing the transform information of the parking #4 with respect to the fiducial marker 408 transform information, the vehicle 402 may deduce its pose relative to parking #4. That information would assist vehicle 402 to park in parking #4 successfully. In addition to transform information and other information written are received from the fiducial marker 408, the vehicle 402 may utilize other sensors that it is equipped with in order to scan the surrounding and detect objects, lanes, other cars, or any other obstacles or markers that it could use in order to assist it in the successful parking into parking #4. For example, a LIDAR of vehicle 402 may be capable of detecting the reflectiveness of lanes 410 and 411.

It is understood that the above descriptions are for purposes of illustration and are not meant to be limiting.

Figure 5:
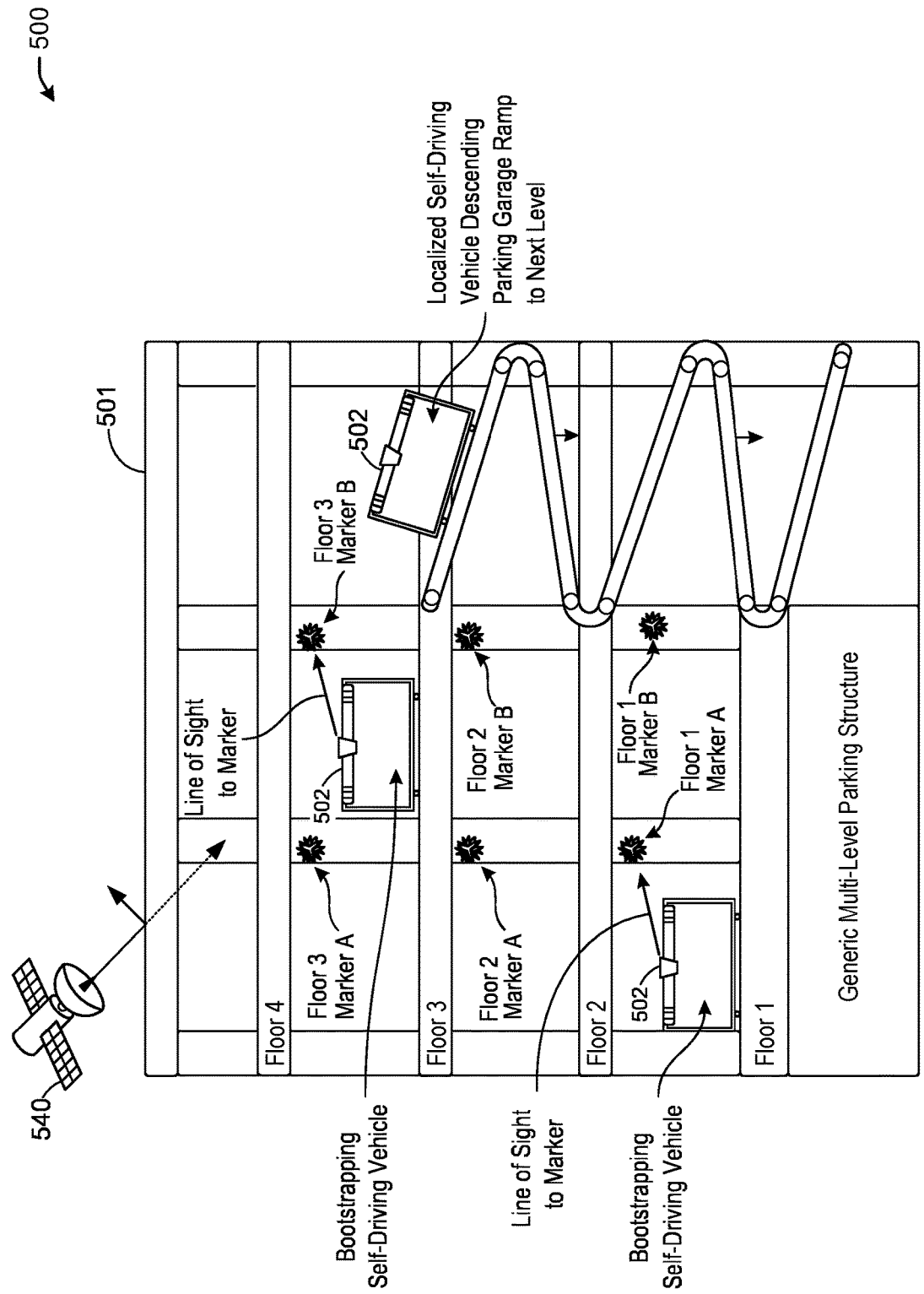
FIG. 5 depicts an illustrative schematic diagram for indoor localization, in accordance with one or more example embodiments of the present disclosure.

FIG. 5 depicts an illustrative schematic diagram 500 for indoor localization, in accordance with one or more example embodiments of the present disclosure.

Referring to FIG. 5, there is shown a building 501 which may be a generic multi-level parking garage or any multi-level depot. A satellite system 540 may provide GPS information through GPS signals transmitted to vehicles that require location information. However as shown in FIG. 5, the signals coming from the satellite system 540 may be reflected off of the roof of the building 501, and only an attenuated signal may go through. This renders the GPS signals unreliable when location information is needed within the building 501 on the various floors. Even if GPS signals were successfully received by the vehicle 502, an issue arises from elevation determination (e.g., being on the first floor versus being on the second floor of the building 501). An indoor localization system may allow for autonomous movement of the self-driving vehicle 502 on each floor and in and out of the building 501.

Further, FIG. 5 shows a bootstrapping self-driving vehicle 502 that may be used to test the functionality of utilizing fiducial markers within each floor in order to determine information that may assist the bootstrapping self-driving vehicle 502 to navigate within each floor and transition from one floor to another. The purpose of the bootstrapping self-driving vehicle is to test out these functionalities before being introduced to autonomous vehicles.

Building 501 is shown to have four floors (floor 1, floor 2, floor 3, floor 4). Each of these floors may have its fiducial markers that comprise information associated with that floor. For example, floor 1 may have a marker A and another marker B. These markers may be fiducial markers that comprise information to the bootstrapping self-driving vehicle 501 based on being in the line of sight with the marker. The bootstrapping self-driving vehicle may navigate on that floor based on information retrieved from marker A and marker B. It should be understood that although only two markers are shown in FIG. 5, any necessary number of markers may be used such that the bootstrapping self-driving vehicle 501 will have at least one marker in its line of sight.

It is understood that the above descriptions are for purposes of illustration and are not meant to be limiting.

Figure 6:
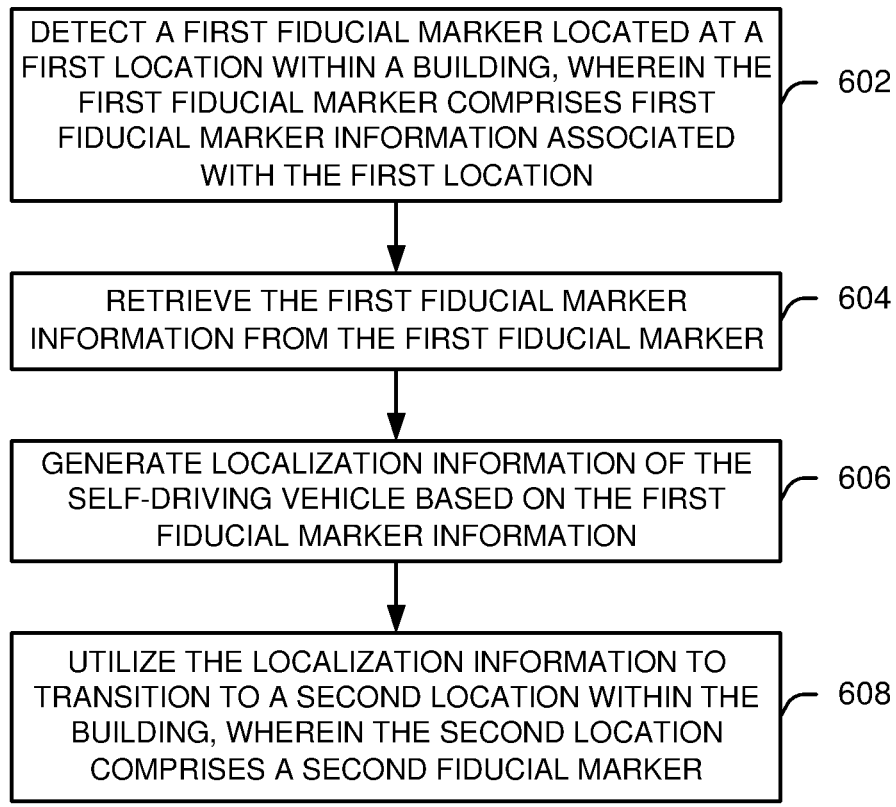
FIG. 6 illustrates a flow diagram of a process for an illustrative indoor localization system, in accordance with one or more example embodiments of the present disclosure.

FIG. 6 illustrates a flow diagram of process 600 for an illustrative indoor localization system, in accordance with one or more example embodiments of the present disclosure.

At block 602, a self-driving vehicle may detect a first fiducial marker located at a first location within a building, wherein the first fiducial marker comprises first fiducial marker information associated with the first location. The first fiducial marker comprises transform information associated with known dimensions of the first fiducial marker. The first fiducial marker is located in the line of sight of the self-driving vehicle. The second fiducial marker is located in the line of sight of the self-driving vehicle. The first fiducial marker information comprises global positioning system (GPS) information of the first location, a floor number of the building, coordinates of the fiducial marker, elevation of the fiducial marker, or a map location of the fiducial marker.

At block 604, the self-driving vehicle may retrieve the first fiducial marker information from the first fiducial marker.

At block 606, the self-driving vehicle may generate localization information of the self-driving vehicle based on the first fiducial marker information.

At block 608, the self-driving vehicle may utilize the localization information to transition to a second location within the building, wherein the second location comprises a second fiducial marker.

The self-driving vehicle may retrieve the first fiducial marker information comprises the processing circuitry further configured to capture an image of the first fiducial marker. The self-driving vehicle may analyze the image of the first fiducial marker. The self-driving vehicle may decode the first fiducial marker information of the first fiducial marker. The self-driving vehicle may calculate a distance from the self-driving vehicle to the first fiducial marker. The self-driving vehicle may detect that the second fiducial marker is moving away from the line of sight of the self-driving vehicle as the self-driving vehicle transitions from the second location to a third location. The self-driving vehicle may detect a third fiducial marker located at the second location of the building, wherein the third fiducial marker is in the line of sight of the self-driving vehicle, and wherein the third fiducial marker comprises third fiducial marker information associated with the second location.

It is understood that the above descriptions are for purposes of illustration and are not meant to be limiting.

Figure 7:
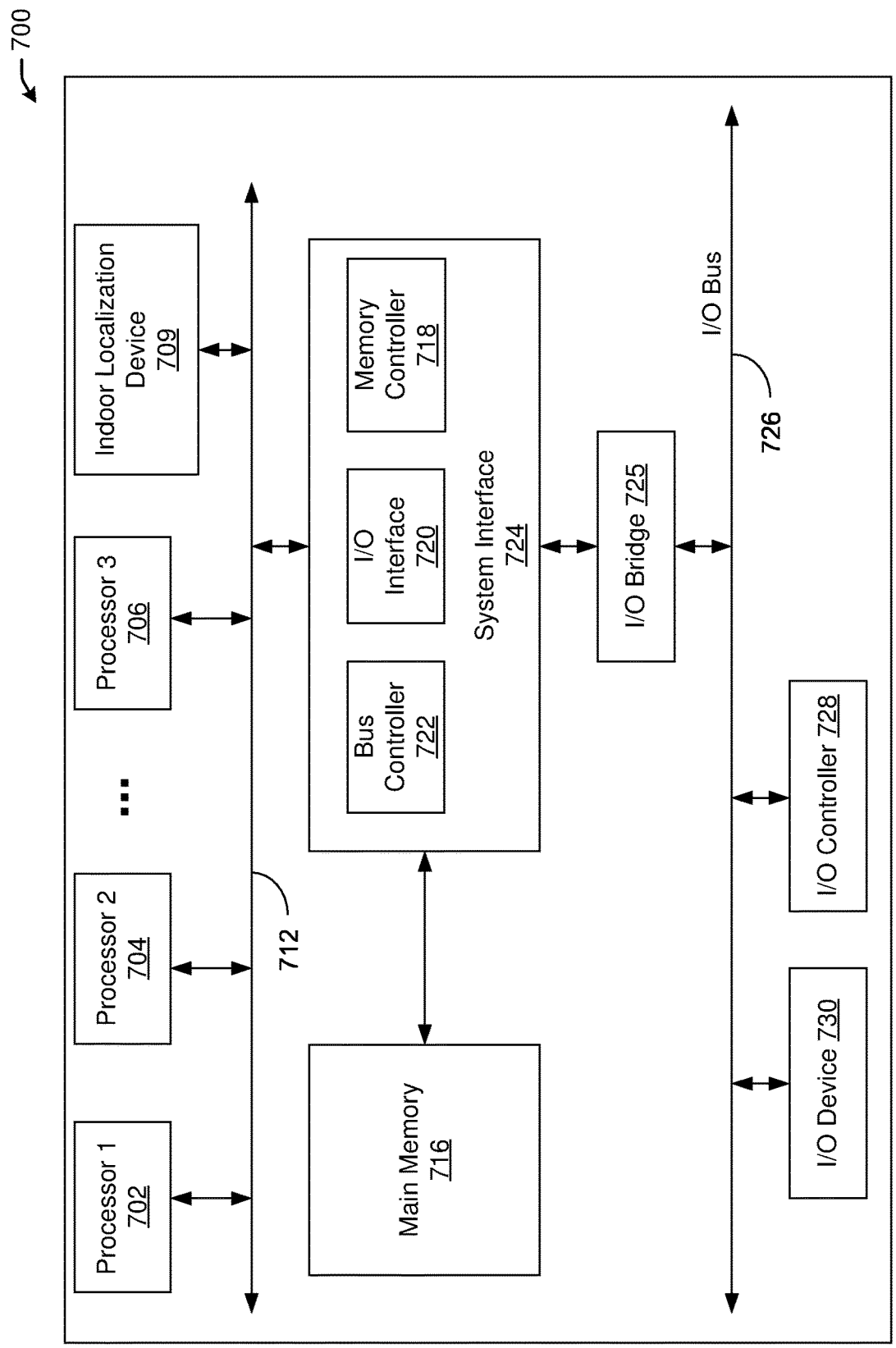
FIG. 7 is a block diagram illustrating an example of a computing device or computer system upon which any of one or more techniques (e.g., methods) may be performed, in accordance with one or more example embodiments of the present disclosure.

FIG. 7 is a block diagram illustrating an example of a computing device or computer system 700 upon which any of one or more techniques (e.g., methods) may be performed, in accordance with one or more example embodiments of the present disclosure.

For example, the computing system 700 of FIG. 7 may represent the one or more processors 132 and/or the one or more measurement devices of FIGS. 2A, 2B, and 3, and therefore may assess and validate the sensors in the sensor system 110 of FIG. 1. The computer system (system) includes one or more processors 702-706. Processors 702-706 may include one or more internal levels of cache (not shown) and a bus controller (e.g., bus controller 722) or bus interface (e.g., I/O interface 720) unit to direct interaction with the processor bus 712. An indoor localization device 709 may also be in communication with the Processors 702-706 and may be connected to the processor bus 712.

Processor bus 712, also known as the host bus or the front side bus, may be used to couple the processors 702-706 and/or the indoor localization device 709 with the system interface 724. System interface 724 may be connected to the processor bus 712 to interface other components of the system 700 with the processor bus 712. For example, system interface 724 may include a memory controller 718 for interfacing a main memory 716 with the processor bus 712. The main memory 716 typically includes one or more memory cards and a control circuit (not shown). System interface 724 may also include an input/output (I/O) interface 720 to interface one or more I/O bridges 725 or I/O devices 730 with the processor bus 712. One or more I/O controllers and/or I/O devices may be connected with the I/O bus 726, such as I/O controller 728 and I/O device 730, as illustrated.

I/O device 730 may also include an input device (not shown), such as an alphanumeric input device, including alphanumeric and other keys for communicating information and/or command selections to the processors 702-706 and/or the indoor localization device 709. Another type of user input device includes cursor control, such as a mouse, a trackball, or cursor direction keys for communicating direction information and command selections to the processors 702-706 and/or the indoor localization device 709 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706 and/or the indoor localization device 709. Main memory 716 also may be used for storing temporary variables or other intermediate information during execution of instructions by the processors 702-706 and/or the indoor localization device 709. System 700 may include read-only memory (ROM) and/or other static storage device coupled to the processor bus 712 for storing static information and instructions for the processors 702-706 and/or the indoor localization device 709. The system outlined in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 and/or the indoor localization device 709 to perform the process steps described herein. In alternative embodiments, circuitry may be used in place of or in combination with the software instructions. Thus, embodiments of the present disclosure may include both hardware and software components.

The processors 702-706 and/or the indoor localization device 709 may facilitate the use of one or more fiducial markers at various locations of an indoor space. Continuing with the example of a parking garage, a fiducial marker may be programmed with various information that assists in localizing a self-driving vehicle in order to allow it to operate within the parking garage. For example, a fiducial marker may comprise, at least in part, GPS coordinate associated with the building, orientation, and hyperlocal information such as parking spaces, floor, or any other indicators. In addition to the information captured in the fiducial marker, an indoor localization system may determine a distance between the vehicle and the fiducial marker using stereo cameras in the vehicle. Other means of determining the distance between the vehicle and the fiducial marker may be used, such as IR, radar, LIDAR, or any other sensors capable of determining such distance. When the vehicle detects and decodes a fiducial marker, the vehicle may use the information comprised in the fiducial marker and the distance to the fiducial marker to estimate the pose of the vehicle to allow it to move about the space in that area. A map associated with the vehicle may help the vehicle determine a path using the information captured from the fiducial marker. The fiducial marker may be associated with a position that is located on the map itself. The vehicle accesses the map in order to determine information associated with the building and also outside the building in the surrounding area (where GPS information is available).

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components.

Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 716, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a self-driving vehicle. The self-driving vehicle also includes detect a first fiducial marker located at a first location within a building, where the first fiducial marker includes first fiducial marker information associated with the first location; retrieve the first fiducial marker information from the first fiducial marker. The self-driving vehicle also includes generate localization information of the self-driving vehicle based on the first fiducial marker information. The self-driving vehicle also includes utilize the localization information to transition to a second location within the building, where the second location includes a second fiducial marker. Other embodiments of this aspect include corresponding computer systems, apparatus, and computer programs recorded on one or more computer storage devices, each configured to perform the actions of the methods.

Implementations may include one or more of the following features. The self-driving vehicle where the first fiducial marker includes transform information associated with known dimensions of the first fiducial marker. The first fiducial marker is located in the line of sight of the self-driving vehicle The second fiducial marker is located in the line of sight of the self-driving vehicle. The first fiducial marker information includes global positioning system (GPS) information of the first location, a floor number of the building, coordinates of the fiducial marker, elevation of the fiducial marker, or a map location of the fiducial marker. Retrieving the first fiducial marker information includes the processing circuitry further configured to: capture an image of the first fiducial marker; analyze the image of the first fiducial marker; and decode the first fiducial marker information of the first fiducial marker. The processing circuitry is further configured to calculate a distance from the self-driving vehicle to the first fiducial marker. The processing circuitry is further configured to: detect that the second fiducial marker is moving away from the line of sight of the self-driving vehicle as the self-driving vehicle transitions from the second location to a third location; detect a third fiducial marker located at the second location of the building, where the third fiducial marker is in the line of sight of the self-driving vehicle, and where the third fiducial marker includes third fiducial marker information associated with the second location. Implementations of the described techniques may include hardware, a method or process, or computer software on a computer-accessible medium.

One general aspect includes a method. The method also includes detecting, by one or more processors of a self-driving vehicle, a first fiducial marker located at a first location within a building, where the first fiducial marker includes first fiducial marker information associated with the first location; retrieving the first fiducial marker information from the first fiducial marker. The method also includes generating localization information of the self-driving vehicle based on the first fiducial marker information. The method also includes utilizing the localization information to transition to a second location within the building, where the second location includes a second fiducial marker. Other embodiments of this aspect include corresponding computer systems, apparatus, and computer programs recorded on one or more computer storage devices, each configured to perform the actions of the methods.

Implementations may include one or more of the following features. The method where the first fiducial marker includes transform information associated with known dimensions of the first fiducial marker. The first fiducial marker is located in the line of sight of the self-driving vehicle The second fiducial marker is located in the line of sight of the self-driving vehicle. The first fiducial marker information includes global positioning system (GPS) information of the first location, a floor number of the building, coordinates of the fiducial marker, elevation of the fiducial marker, or a map location of the fiducial marker. Retrieving the first fiducial marker information includes: capturing an image of the first fiducial marker; analyzing the image of the first fiducial marker; and decoding the first fiducial marker information of the first fiducial marker. The method further including calculate a distance from the self-driving vehicle to the first fiducial marker. The third fiducial marker is in the line of sight of the self-driving vehicle, and where the third fiducial marker includes third fiducial marker information associated with the second location. Implementations of the described techniques may include hardware, a method or process, or computer software on a computer-accessible medium.

One general aspect includes a non-transitory computer-readable medium storing computer-executable instructions which when executed by one or more processors of a self-driving vehicle result in performing operations. The non-transitory computer-readable medium storing computer-executable instructions also includes detecting a first fiducial marker located at a first location within a building, where the first fiducial marker includes first fiducial marker information associated with the first location; retrieving the first fiducial marker information from the first fiducial marker. The non-transitory computer-readable medium storing computer-executable instructions also includes generating localization information of the self-driving vehicle based on the first fiducial marker information. The non-transitory computer-readable medium storing computer-executable instructions also includes utilizing the localization information to transition to a second location within the building, where the second location includes a second fiducial marker. Other embodiments of this aspect include corresponding computer systems, apparatus, and computer programs recorded on one or more computer storage devices, each configured to perform the actions of the methods.

Implementations may include one or more of the following features. The non-transitory computer-readable medium where the first fiducial marker includes transform information associated with known dimensions of the first fiducial marker. The first fiducial marker is located in the line of sight of the self-driving vehicle The second fiducial marker is located in the line of sight of the self-driving vehicle. Implementations of the described techniques may include hardware, a method or process, or computer software on a computer-accessible medium.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A self-driving vehicle, the self-driving vehicle comprising processing circuitry coupled to storage and a sensor system, the processing circuitry configured to:
    detect, using a camera of the sensor system, a transitional fiducial marker located at a transition point corresponding to a building;
    transition the processing circuitry from utilizing global positioning system (GPS) signals to utilizing one or more fiducial markers placed within the building for in-building navigation, using information retrieved from the transitional fiducial marker;
    detect, using the camera of the sensor system, a first fiducial marker of the one more fiducial markers, wherein the first fiducial marker is located at a first location within the building;
    retrieve, from the first fiducial marker, first fiducial marker information associated with the first location and transform information associated with a second location corresponding to a second fiducial marker of the one more fiducial markers, wherein the transform information is used by the self-driving vehicle to determine its pose relative to the second location;
    generate localization information of the self-driving vehicle based on the first fiducial marker information; and
    transition the self-driving vehicle to the second location within the building based on the localization information and the transform information.

2. The self-driving vehicle of claim 1, wherein the transform information includes transformation matrices that describe rotation and translation of the self-driving vehicle with respect to the second location.

3. The self-driving vehicle of claim 1, wherein the first fiducial marker is located in the line of sight of the self-driving vehicle.

4. The self-driving vehicle of claim 1, wherein the second fiducial marker is located in the line of sight of the self-driving vehicle.

5. The self-driving vehicle of claim 1, wherein the first fiducial marker information comprises global positioning system (GPS) information of the first location, a floor number of the building, coordinates of the fiducial marker, elevation of the fiducial marker, or a map location of the fiducial marker.

6. The self-driving vehicle of claim 1, wherein retrieving the first fiducial marker information comprises the processing circuitry further configured to:
    capture an image of the first fiducial marker;

analyze the image of the first fiducial marker; and
decode the first fiducial marker information of the first fiducial marker.

7. The self-driving vehicle of claim 1, wherein the processing circuitry is further configured to calculate a distance from the self-driving vehicle to the first fiducial marker.

8. The self-driving vehicle of claim 1, wherein the processing circuitry is further configured to:
detect that the second fiducial marker is moving away from the line of sight of the self-driving vehicle as the self-driving vehicle transitions from the second location to a third location;
detect a third fiducial marker of the one more fiducial markers located at the second location of the building, wherein the third fiducial marker is in the line of sight of the self-driving vehicle, and wherein the third fiducial marker comprises third fiducial marker information associated with the second location.

9. A method comprising:
detecting, using a camera of a sensor system of a self-driving vehicle, a transitional fiducial marker located at a transition point corresponding to a building;
transitioning a processing circuitry of the self-driving vehicle from utilizing global positioning system (GPS) signals to utilizing one or more fiducial markers placed within the building for in-building navigation, using information retrieved from the transitional fiducial marker;
detecting, using the camera of the sensor system of the self-driving vehicle, a first fiducial marker of the one more fiducial markers, wherein the first fiducial marker is located at a first location within the building;
retrieving, from the first fiducial marker, first fiducial marker information associated with the first location and transform information associated with a second location corresponding to a second fiducial marker of the one more fiducial markers, wherein the transform information is used by the self-driving vehicle to determine its pose relative to the second location;
generating localization information of the self-driving vehicle based on the first fiducial marker information; and
transition the self-driving vehicle to the second location within the building based on the localization information and the transform information.

10. The method of claim 9, wherein the transform information includes transformation matrices that describe rotation and translation of the self-driving vehicle with respect to the second location.

11. The method of claim 9, wherein the first fiducial marker is located in the line of sight of the self-driving vehicle.

12. The method of claim 9, wherein the second fiducial marker is located in the line of sight of the self-driving vehicle.

13. The method of claim 9, wherein the first fiducial marker information comprises global positioning system (GPS) information of the first location, a floor number of the building, coordinates of the fiducial marker, elevation of the fiducial marker, or a map location of the fiducial marker.

14. The method of claim 9, wherein retrieving the first fiducial marker information comprises:
capturing an image of the first fiducial marker;
analyzing the image of the first fiducial marker; and
decoding the first fiducial marker information of the first fiducial marker.

15. The method of claim 9, further comprising calculate a distance from the self-driving vehicle to the first fiducial marker.

16. The method of claim 9, further comprising:
detecting that the second fiducial marker is moving away from the line of sight of the self-driving vehicle as the self-driving vehicle transitions from the second location to a third location;
detecting a third fiducial marker of the one more fiducial markers located at the second location of the building, wherein the third fiducial marker is in the line of sight of the self-driving vehicle, and wherein the third fiducial marker comprises third fiducial marker information associated with the second location.

17. A non-transitory computer-readable medium storing computer-executable instructions which when executed by one or more processors of a self-driving vehicle result in performing operations comprising:
detecting, using a camera of a sensor system of the self-driving vehicle, a transitional fiducial marker located at a transition point corresponding to a building;
transitioning a processing circuitry of the self-driving vehicle from utilizing global positioning system (GPS) signals to utilizing one or more fiducial markers placed within the building for in-building navigation, using information retrieved from the transitional fiducial marker;
detecting, using the camera of the sensor system of the self-driving vehicle, a first fiducial marker of the one more fiducial markers, wherein the first fiducial marker is located at a first location within the building;
retrieving, from the first fiducial marker, first fiducial marker information associated with the first location and transform information associated with a second location corresponding to a second fiducial marker of the one more fiducial markers, wherein the transform information is used by the self-driving vehicle to determine its pose relative to the second location;
generating localization information of the self-driving vehicle based on the first fiducial marker information; and
transition the self-driving vehicle to the second location within the building based on the localization information and the transform information.

18. The non-transitory computer-readable medium of claim 17, wherein the transform information includes transformation matrices that describe rotation and translation of the self-driving vehicle with respect to the second location.

19. The non-transitory computer-readable medium of claim 17, wherein the first fiducial marker is located in the line of sight of the self-driving vehicle.

20. The non-transitory computer-readable medium of claim 17, wherein the second fiducial marker is located in the line of sight of the self-driving vehicle.

* * * * *